United States Patent
Chu et al.

(10) Patent No.: US 9,600,318 B2
(45) Date of Patent: Mar. 21, 2017

(54) METHOD AND SYSTEM FOR CLOSING APPLICATION PROGRAMS OF AN APPLICATION SYSTEM

(71) Applicant: ZTE CORPORATION, Shenzhen, Guangdong Province (CN)

(72) Inventors: Junsheng Chu, Shenzhen (CN); Wei Wang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/421,639

(22) PCT Filed: Jul. 2, 2013

(86) PCT No.: PCT/CN2013/078673
§ 371 (c)(1),
(2) Date: Feb. 13, 2015

(87) PCT Pub. No.: WO2013/178127
PCT Pub. Date: Dec. 5, 2013

(65) Prior Publication Data
US 2015/0301845 A1    Oct. 22, 2015

(30) Foreign Application Priority Data

Aug. 28, 2012  (CN) .......................... 2012 1 0309981

(51) Int. Cl.
*G06F 9/455* (2006.01)
*G06F 9/46* (2006.01)
(Continued)

(52) U.S. Cl.
CPC ............ *G06F 9/45558* (2013.01); *G06F 9/48* (2013.01); *G06F 9/485* (2013.01); *G06F 2009/4557* (2013.01); *G06F 2009/45575* (2013.01)

(58) Field of Classification Search
None
See application file for complete search history.

(56) References Cited

U.S. PATENT DOCUMENTS

2005/0278700 A1* 12/2005 Buskens ................ G06F 9/485
                                                        717/120
2009/0249354 A1   10/2009 Yamaguchi et al.
2011/0239215 A1    9/2011 Sugai

FOREIGN PATENT DOCUMENTS

| CN | 1633639 A   | 6/2005  |
|----|-------------|---------|
| CN | 102214117 A | 10/2011 |
| CN | 102455942 A | 5/2012  |

OTHER PUBLICATIONS

European Search Report issued Aug. 4, 2016, for EP Application No. 13797809.4.

* cited by examiner

*Primary Examiner* — Bing Zhao
(74) *Attorney, Agent, or Firm* — Plumsea Law Group, LLC

(57) ABSTRACT

A method and system for closing an application program are provided. The method comprises: a deployment platform determining a virtual machine relevant to an application system according to configuration information of the application system when the application system is to be closed; and the deployment platform sending an indication message for closing the application system to the virtual machine relevant to the application system, wherein, the indication message for closing the application system is used for indicating the virtual machine relevant to the application system to close application programs in the application system in sequence. Through the above-mentioned technical scheme, the deployment platform indicates a virtual machine relevant to an application system required to be (Continued)

closed to close application programs in the application system in sequence, which makes multiple application programs of the application system deployed on multiple virtual machines can be closed in sequence.

15 Claims, 5 Drawing Sheets

(51) Int. Cl.
*G06F 9/44* (2006.01)
*G06F 9/48* (2006.01)

METHOD AND SYSTEM FOR CLOSING APPLICATION PROGRAMS OF AN APPLICATION SYSTEM

CROSS-REFERENCE TO RELATED APPLICATION(S)

This application is the U.S. National Phase application of PCT application number PCT/CN2013/078673 having a PCT filing date of Jul. 2, 2013, which claims priority of Chinese patent application 201210309981.9 filed on Aug. 28, 2012, the disclosures of which are hereby incorporated by reference.

TECHNICAL FIELD

The present document relates to the field of the data center and the virtualization technology, and in particular, to a method and system for closing an application program.

BACKGROUND OF THE RELATED ART

The virtualization technology is the construction basis of the cloud service platform. The virtualization technology refers to that the physical resources are, in a physical server, split into a plurality of logic partitions through the virtual management software, Hypervisor, and each partition is isolated with each other and becomes the independent virtual machine. In view of operating system and application program, there is no difference between the virtual machine and the physical server, and they can share the resources of the same one physical server.

The cloud service platform supports providing the virtual system rental service for the cloud service users, and the so-called virtual system refers to the resource set including a series of virtual machines, storages and networks which are connected or related to each other. In order to make it convenient for the users to host the traditional application system onto the virtual system, the virtualization platform also provides the deployment and management function of the virtual system for the cloud service users, including deploying the application program of the traditional application system on the virtual machine, and providing the function of controlling sequential starting of the application programs with dependence.

After the application system is hosted to the cloud service platform, one or more application programs may operate on one virtual machine, so the cloud service platform is required to control and coordinate the starting sequence control of the application system together with the virtual machine. For the demand for controlling the starting sequence, for example, for some Web systems, the Web application and the Web service start depending on the information of the database, so the database is required to start first. But the database may be deployed with a certain Web application or Web service on the same one virtual machine. If the control for sequential starting the virtual machines does not meet the requirement, it further needs the function of controlling the starting sequence of application programs within the virtual machine.

FIG. 1 is a diagram of a cloud service platform model according to the related art; as shown in FIG. 1, the model in the figure includes a deployment platform 12 which deploys the Open Virtualization Format (OVF) package of the application system. The OVF package includes the information such as the resource configuration of the virtual machine, the mapping file, the environment, etc., which is included in the application system. The deployment process of the cloud service platform to the OVF package is the recovery procedure of the application system and its contained environment configuration information of the virtual machine. The deployment platform 12 is responsible for managing the starting sequence of the virtual machines on which the application system is deployed, and coordinating the starting sequence of the application programs. The configuration information of the application system includes the configuration information related to the application program in the application system, such as the starting sequence of the application programs, the identification of the virtual machine where the application is located, etc. The virtual machine 14 is a virtual resource entity which encapsulates the CPU, the memory, the local magnetic disc and the network, etc. The virtual machine manager 16 is responsible for managing the virtual machine within the host computer system, including starting and closing of the virtual machine, the resource allocation of the virtual machine, etc. The application program is a certain program of the application system so as to realize partial functions of the application system, and the application program can run independently and may also depend on the starting of other application programs. The control engine 142 is responsible for coordinating the starting and closing of the application program within the virtual machine and mutually coordinating among the application programs, and the control engine 142 is triggered to start up by the operating system in the virtual machine after the virtual machine starts up.

FIG. 2 is an interaction flow chart for starting according to a sequence of activating engines of the virtual machines in the related art. As shown in FIG. 2, assuming that the application system needs two virtual machines, these two virtual machines are provided by the host computer system X and the host computer system Y respectively, and the two corresponding virtual machines are the virtual machine X1 and the virtual machine Y1 respectively, and the virtual machine Y1 depends on the virtual machine X1, that is, the virtual machine X1 is required to start first.

In step S202, the cloud service users establish the application system through the deployment platform, which includes determining the required virtual machine, planning the configuration information, such as the deployment of the application program included in the application system in the virtual machine, the starting sequence related to the application program, etc.

From step S204~step S210, the deployment platform leads the virtual machine X1 in the host computer system X to start first.

In step S204, the deployment platform sends a request for starting the virtual machine X1 to the virtual machine manager of the host computer system X.

In step S206, the virtual machine manager of the host computer system X leads the starting of the operating system of the virtual machine X1.

In step S208, the operating system of the virtual machine X1 runs the engine activating program.

In step S210, the activation engine of the virtual machine X1 returns a system activation completion message to the deployment platform.

In step S212, the deployment platform transmits the configuration information related to the application program in the application system to the program coordinator and the activation engine of the virtual machine X1.

From step S214~step S220, the deployment platform, according to the configuration information related to leading the application program, controls the starting of the virtual machine Y1 in the host computer system Y.

In step S214, the deployment platform sends a request for starting the virtual machine Y1 to the virtual machine manager of the host computer system Y.

In step S216, the virtual machine manager of the host computer system Y leads the starting of the operating system of virtual machine Y1.

In step S218, the operating system of the virtual machine Y1 runs the engine activating program.

In step S220, the activation engine of the virtual machine Y1 returns a system activation completion message to the deployment platform.

In step S222, the deployment platform transmits the configuration information related to the application program in the application system to the activation engine of the virtual machine Y1.

FIG. 3 is an interaction flow chart of a sequence starting the application programs in the virtual machine according to the related art. As shown in FIG. 3, assuming that the application system needs two virtual machines, these two virtual machines are provided by the host computer system X and the host computer system Y respectively, and the two corresponding virtual machines are the virtual machine X1 and the virtual machine Y1 respectively. The virtual machine X1 includes the application program X11 and the application program X12, and the virtual machine Y1 includes the application program Y11 and the application program Y12. The application program X11 and the application program Y11 do not depend on other application programs, and the application program Y12 depends on the application program X12, that is, the application program X12 is required to start first.

In step S302, the cloud service users establish the application system through the deployment platform, which includes determining the required virtual machine, planning the configuration information, such as the deployment of the application program included by the application system in the virtual machine, the starting sequence related to the application program, etc.

In step S304, the deployment platform leads the starting of the virtual machine X1 and its activation engine, including the transmission of the application program information, which can refer to the step S204~step S212 as shown in FIG. 2 specifically.

In step S306, the deployment platform leads the starting of the virtual machine Y1 and its activation engine, including the transmission of the application program information, which can refer to the step S214~step S222 as shown in FIG. 2 specifically.

In step S308, after the activation engine in the virtual machine X1 starts, the activation engine will start the application program automatically, where the application program X11 without the dependence is started at first.

In step S310, after the activation engine in the virtual machine Y1 starts, the activation engine will start the application program automatically, where the application program Y11 without the dependence is started at first. Because the starting of application program Y12 depends on first starting of the application program X12, the activation engine will set a timer T to wait for a notification message that the application program X12 is started completely.

Wherein, in the above-mentioned step S308 and step S310, there is no precedence sequence between the processing for the activation engine in the virtual machine X1 to start the application program without the dependence and the processing for the activation engine in the virtual machine Y1 to start the application program without the dependence, and they can be processed at the same time.

From step S312~step S316, the activation engine in the virtual machine X1 starts the application program X12.

In step S312, the activation engine of the virtual machine X1 initiates a request for performing the application program X12 to the operating system of the virtual machine X1.

In step S314, the operating system of the virtual machine X1 returns a program execution completion message to the activation engine of the virtual machine X1 after the application program X12 is performed completely.

In step S316, the activation engine of the virtual machine X1 sends the program execution completion indication carrying the application program X12 identification to the deployment platform.

In step S318, the deployment platform obtains that the application program Y12 depends on the application program X12 according to the configuration information of the application system, then it forwards the program execution completion indication carrying the application program X12 identification to the virtual machine Y1 where the application program Y12 is located.

From step S320~step S324, the activation engine in the virtual machine Y1 starts the application program Y12.

In step S320, after the activation engine of the virtual machine Y1 receives the execution completion indication about the application program X12, it stops the timer T, and initiates the request for performing the application program Y12 to the operating system of the virtual machine Y1.

In step S322, the operating system of the virtual machine Y1 returns a program execution completion message to the activation engine of the virtual machine Y1 after the application program Y12 is performed completely.

In step S324, the activation engine of the virtual machine Y1 sends the program execution completion indication carrying the application program Y12 identification to the deployment platform.

At present, the deployment of the cloud service platform to the application system is to control and coordinate the interaction with the activation engine in the virtual machine through the deployment platform. For the starting sequence among the application programs with dependence, the activation engine in the virtual machine controls the starting sequence of the application programs within the virtual machine, and the deployment platform controls the starting sequence of the application programs across the host computer system.

But for some conventional application systems, when the application system is closed, there is also the closing dependence of the application program, that is, the application programs of the application system are required to be closed according to a certain sequence. Because a plurality of application programs will be deployed on the same one virtual machine, the sequential closing of the virtual machines adopted in the current standard is unable to meet the demands.

CONTENT OF THE SUMMARY

The present document provides a method and system for closing an application program, in order to solve at least the problem in the related art that when the application system is to be closed, multiple application programs may be deployed on one virtual machine and require to be closed according to a certain sequence, but this demand cannot be met by the sequentially closing the virtual machines.

In order to solve the above-mentioned technical problem, the present document adopts the following technical scheme.

A method for closing an application program comprises: when an application system is to be closed, a deployment platform determining a virtual machine relevant to an application system according to configuration information of the application system; and the deployment platform sending an indication message for closing the application system to the virtual machine relevant to the application system, wherein, the indication message for closing the application system is used for indicating the virtual machine relevant to the application system to close application programs in the application system in sequence.

Alternatively, the step of the deployment platform sending an indication message for closing the application system to the virtual machine relevant to the application system comprises: the deployment platform sending the indication message for closing the application system to a control engine of the virtual machine relevant to the application system, wherein, the control engine is used for responding to the deployment platform, and controlling sequential closing of the application programs relevant to the application system in the virtual machine.

Alternatively, after the deployment platform sending the indication message for closing the application system to the virtual machine relevant to the application system, the above-mentioned method further comprises: the control engine receiving the indication message for closing the application system from the deployment platform, and closing the application program without dependence in the virtual machine to which the control engine belongs; the control engine judging whether an application program depending on other application program exists in the virtual machine to which the control engine belongs; and if yes, the control engine setting a timer to wait for a closing completion message of a depended application program.

Alternatively, after the control engine closes the application program without dependence in the virtual machine to which the control engine belongs, the above-mentioned method further comprises: if the depended application program exists in the virtual machine, then the control engine closing the depended application program; and after the closing is completed, the control engine sending the closing completion message of the application program to the deployment platform, wherein, the closing completion message of the application program carries an identification of the depended application program.

Alternatively, the step of the control engine closing the depended application program comprises: the control engine sending a program closing request to an operating system of the virtual machine to which the control engine belongs; and after the depended application program is closed completely, the control engine receiving the closing completion message of the application program from the operating system, wherein, the closing completion message of the application program carries the identification of the depended application program.

Alternatively, after the control engine sends the closing completion message of the application program to the deployment platform, the above-mentioned method further comprises: the deployment platform receiving the closing completion message of the application program from the control engine; the deployment platform determining an application program depending on an already closed application program according to configuration information of the application system; and the deployment platform forwarding the closing completion message of the application program to the virtual machine to which the application program depending on the already closed application program belongs.

Alternatively, after the deployment platform forwards the closing completion message of the application program to the virtual machine to which the application program depending on the already closed application program belongs, the above-mentioned method further comprises: a control engine of the virtual machine to which the application program depending on the already closed application program belongs receiving the closing completion message of the application program, stopping the timer, and closing the application program depending on the already closed application program.

Alternatively, after the deployment platform sends the indication message for closing the application system to the virtual machine relevant to the application system, the above-mentioned method further comprises: the deployment platform receiving a closing completion messages for all the application programs from the virtual machine; and the deployment platform notifying a virtual machine manager of a host computer system to which the virtual machine belongs to close the virtual machine.

Alternatively, after the deployment platform notifies a virtual machine manager of a host computer system to which the virtual machine belongs to close the virtual machine, the above-mentioned method further comprises: the deployment platform receiving a closing completion message of the virtual machine from the virtual machine manager; the deployment platform determining that the virtual machines relevant to the application system required to be closed are all closed; and the deployment platform returning the closing completion message of the application system.

Alternatively, before the deployment platform determines the virtual machine relevant to the application system according to the configuration information of the application system, further comprising: the deployment platform receiving an application system closing request.

Alternatively, the application system comprises one or more application programs, the one or more application programs are deployed on a series of virtual machines, and each virtual machine runs one or more application programs.

Alternatively, the configuration information of the application system comprises: a closing sequence of the application programs in the application system, and a virtual machine corresponding to the application program.

A system for closing an application program comprises a deployment platform and a host machine system, wherein:

the deployment platform comprises a determination module and a sending module, wherein:

the determination module is configured to: determine a virtual machine relevant to an application system according to configuration information of the application system when the application system is to be closed;

the sending module is configured to: send an indication message for closing the application system to the virtual machine relevant to the application system, wherein, the indication message for closing the application system is used for indicating the virtual machine relevant to the application system to close application programs in the application system in sequence; and the host computer system comprises: a virtual machine manager and one or more virtual machines, the virtual machine comprises: an operating system, a control engine and one or more application programs, and the control engine is used for responding to the deployment platform, and controlling sequential closing of the application programs in the application system.

Through the above-mentioned technical scheme, the deployment platform indicates the virtual machine relevant to the application system required to be closed to close the application programs in the application system in sequence, which makes multiple application programs of the application system deployed on multiple virtual machines be closed in sequence.

BRIEF DESCRIPTION OF THE DRAWINGS

The accompanying drawings described herein are used to provide further understanding for the present document and constitute a part of the present application. The illustrated embodiments of the present document and the description thereof are used to explain the present document, rather than constituting an inappropriate limitation to the present document. Wherein.

PREFERRED EMBODIMENTS OF THE PRESENT DOCUMENT

It should be illustrated that, in the case of not conflicting, the embodiments in the present application and features in these embodiments can be combined with each other. The present document is described in detail with reference to the accompanying drawings and in combination with embodiments hereinafter.

Figure 1:
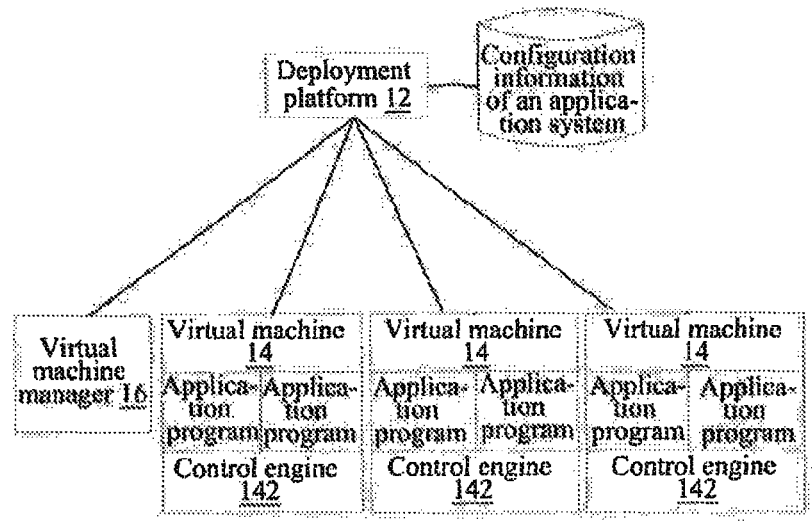
FIG. 1 is a diagram of a cloud service platform model according to the related art.
Figure 2:
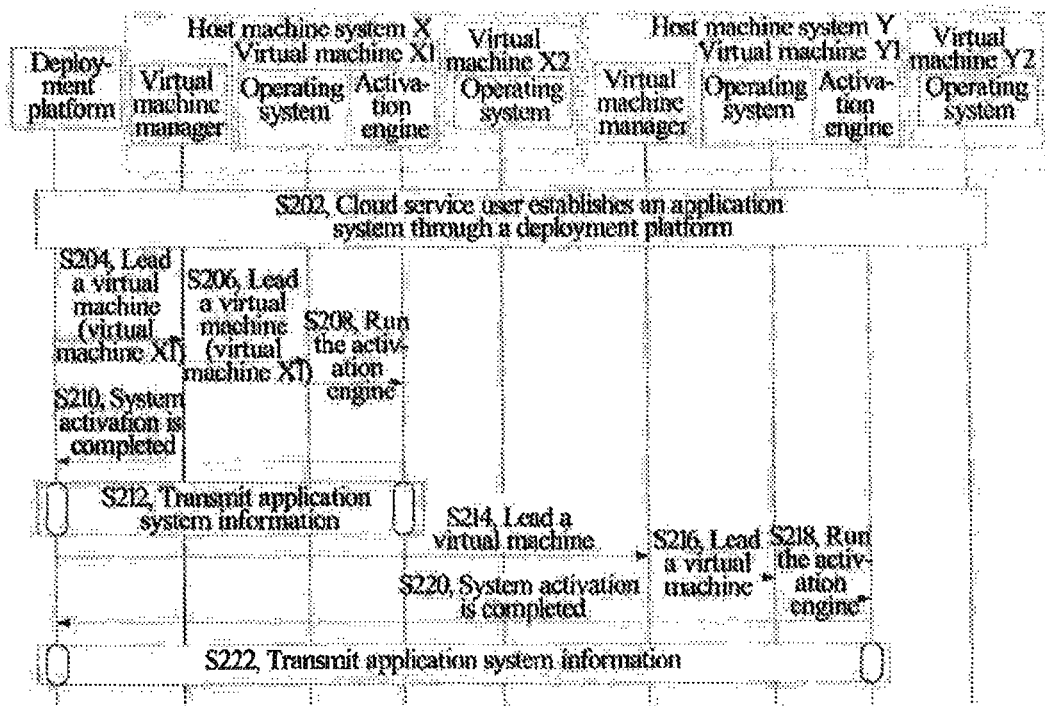
FIG. 2 is an interaction flow chart of a sequence starting the activation engine in the virtual machine according to the related art.
Figures 3, 4:
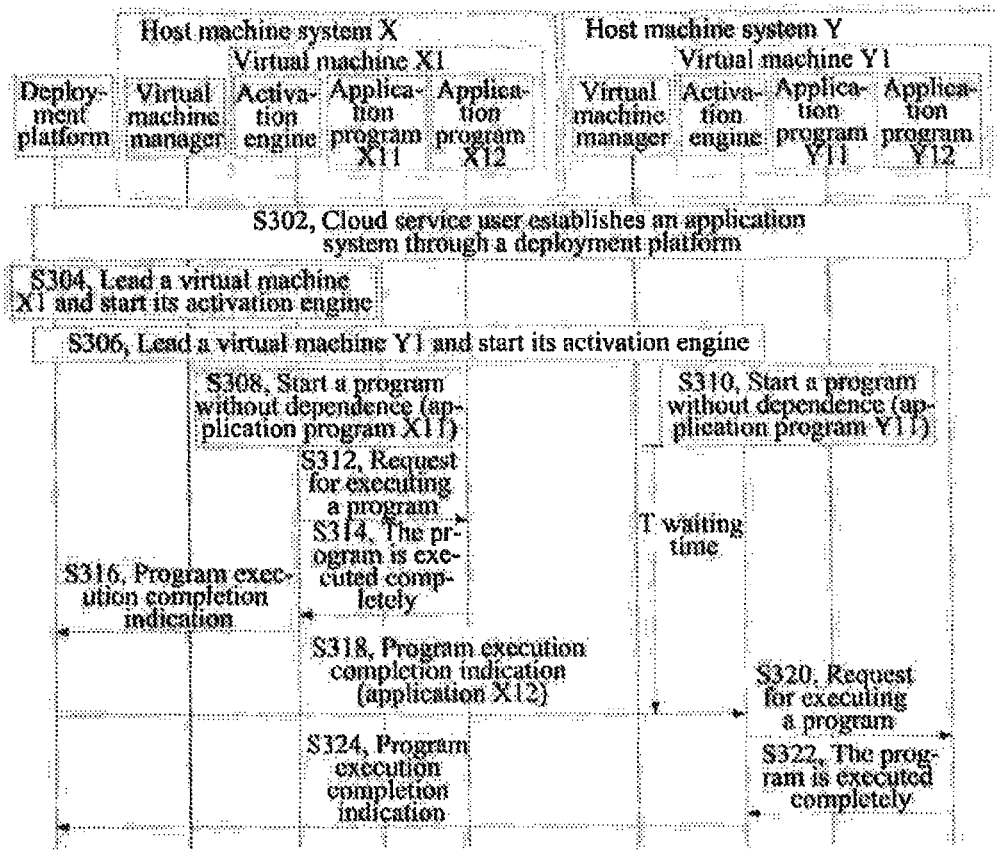
FIG. 3 is an interaction flow chart of a sequence starting the application programs in the virtual machine according to the related art.
FIG. 4 is a flow chart of a method for closing an application program according to an embodiment of the present document.

The embodiment of the present document provides a method for closing an application program. FIG. 4 is a flow chart of a method for closing an application program according to an embodiment of the present document, as shown in FIG. 4, including the following step S402 to step S404.

In step S402, the deployment platform determines a virtual machine relevant to an application system according to configuration information of the application system when closing the application system.

In step S404, the deployment platform sends an indication message for closing the application system to the virtual machine relevant to the application system, wherein, the indication message for closing the application system is used for indicating the virtual machine relevant to the application system to close application programs in the application system in sequence.

In the related art, when the application system is to be closed, a plurality of application programs which may be deployed on one virtual machine are required to be closed according to a certain sequence. The sequential closing of virtual machines adopted in the current standard is unable to meet the demands, therefore, the cloud service platform is required to provide the mechanism to control and coordinate the sequential closing of the application programs in the application system. In the embodiment of the present document, the application programs in the application system are closed in sequence through the indication of the deployment platform and the virtual machine relevant to the application system required to be closed, which makes multiple application programs of the application system deployed on the multiple virtual machines be able to be closed in sequence.

The above-mentioned application system includes one or more the application programs, the one or more application programs are deployed on a series of virtual machines, and one or more the application programs are operated on each virtual machine.

The above-mentioned configuration information of the application system includes: an closing sequence of application programs in the application system, and a virtual machine corresponding to the application program.

Step S404 includes: the deployment platform sending the indication message for closing the application system to a control engine of the virtual machine relevant to the application system, wherein, the control engine is used for responding to the deployment platform, and controlling sequential closing of the application programs relevant to the application system in the virtual machine. In the present optional embodiment, the deployment platform sends the indication message for closing the application system to the control engine of the virtual machine, thus it can control the sequential closing of each application program within the virtual machine through the control engine of the virtual machine.

It should be explained that the above-mentioned control engine is a name in consideration of closing the application program on the basis of the current activation engine, and the control engine includes the activation control to the application program in the related art, and also includes the closing control to the application program by the embodiment of the present document at the same time.

After the step S404, the control engine needs to close the application programs in the virtual machine to which it belongs in sequence according to the received indication message for closing the application system. The application programs without dependence are closed at first, and after the application programs with dependence are all closed, it needs to send a closing completion message to the deployment platform. Specifically, for the application programs depending on other application programs, they need to be closed after the closing completion messages of their dependent applications are received from the deployment platform. As to a depended application program, after it is closed normally, the closing completion message is sent to the deployment platform. The sequential closing procedure of the above-mentioned application programs is described in detail as follows.

The control engine receives the indication message for closing the application system from the deployment platform, and closes the application program without dependence in the virtual machine to which the control engine belongs; the control engine judges whether an application program depending on other application program exists in the virtual machine to which the control engine belongs; and if yes, the control engine sets a timer to wait for a closing completion message of a depended application program.

After the control engine closes the application program without dependence in the virtual machine to which the control engine belongs, the above-mentioned method further includes: if the depended application program exists in the virtual machine, then the control engine closing the depended application program; and after the closing is completed, the control engine sending the closing completion message of the application program to the deployment platform, wherein, the closing completion message of the application program carries an identification of the depended application program.

Alternatively, the control engine closing the depended application program includes: the control engine sending a program closing request to an operating system of the virtual machine to which the control engine belongs; and after the depended application program is closed completely, the control engine receives the closing completion message of the application program from the operating system, wherein, the closing completion message of the application program carries the identification of the depended application program.

Alternatively, after the control engine sends the closing completion message of the application program to the deployment platform, the above-mentioned method further includes: the deployment platform receiving the closing completion message of the application program from the control engine; the deployment platform determining an application program depending on an already closed application program according to configuration information of the application system; and the deployment platform forwarding the closing completion message of the application program to the virtual machine to which the application program depending on the already closed application program belongs, to indicate it to close the application program depending on the already closed application program.

Alternatively, after the deployment platform forwards the closing completion message of the application program to the virtual machine to which the application program depending on the already closed application program belongs, the above-mentioned method further includes: a control engine of the virtual machine to which the application program depending on the already closed application program belongs receiving the closing completion message of the application program, stopping the timer, and closing the application program depending on the already closed application program. The process of closing the application program depending on the depended application program is consistent with the above-mentioned process of closing the depended application program, and both are finished through the operating system of the virtual machine, and after the closing is complete, the closing completion message is sent to the deployment platform, and the specific process will no longer go into details here.

After the application programs in the virtual machine are closed in sequence, the virtual machine relevant to the application system is also required to be closed. After the deployment platform sends the indication message for closing the application system to the virtual machine relevant to the application system, the above-mentioned method further includes: the deployment platform receiving closing completion messages of all the application programs from the virtual machine; and the deployment platform notifying a virtual machine manager of a host computer system to which the virtual machine belongs to close the virtual machine.

After the deployment platform notifies a virtual machine manager of a host computer system to which the virtual machine belongs to close the virtual machine, the virtual machine manager closes the virtual machine. After the closing is complete, the deployment platform receives a closing completion message of the virtual machine from the virtual machine manager; the deployment platform determines that the virtual machines relevant to the application system required to be closed are all closed; and the deployment platform returns the closing completion message of the application system.

Before the step S402, the above-mentioned method further includes: the deployment platform receiving an application system closing request.

Figure 5:
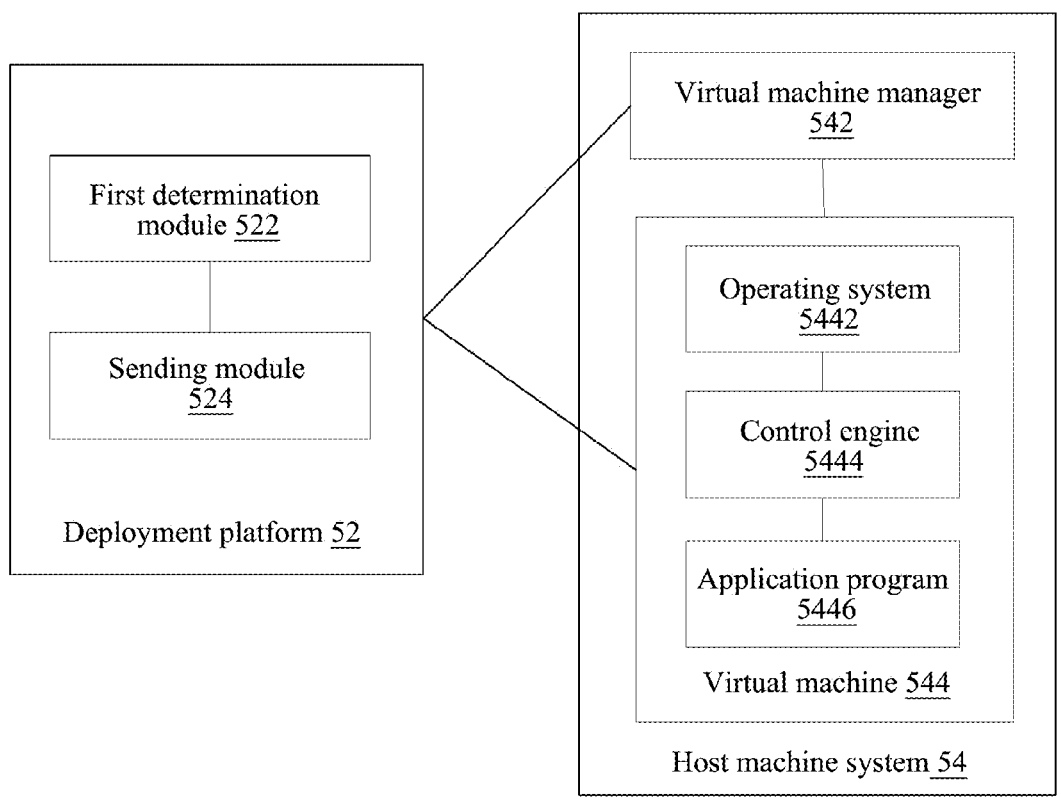
FIG. 5 is a structure block diagram of a system for closing the application program according to an embodiment of the present document.

The embodiment of the present document further provides a system for closing an application program, which can be used for realizing the above-mentioned method for closing the application system. FIG. 5 is a structure block diagram of a system for closing the application program according to an embodiment of the present document. As shown in FIG. 5, the system includes a deployment platform 52 and a host machine system 54. Their structures will be described in detail hereinafter.

The deployment platform 52 includes a first determination module 522 and a sending module 524, wherein:

the first determination module 522 is configured to: determine a virtual machine relevant to an application system according to configuration information of the application system when closing the application system;

the sending module 524 is connected to the first determination module 522 and configured to: send an indication message for closing the application system to the virtual machine relevant to the application system, wherein, the indication message for closing the application system is used for indicating the virtual machine relevant to the application system to close application programs in the application system in sequence.

The host computer system 54 includes: a virtual machine manager 542 and one or more virtual machines 544, the virtual machine 544 includes: an operating system 5442, a control engine 5444 and one or more application programs 5446, and the control engine 5444 is configured to respond to the deployment platform, and control sequential closing of the application programs in the application system.

The sending module 524 includes a sending unit, which is configured to: send the indication message for closing the application system to a control engine of the virtual machine relevant to the application system.

The control engine 5444 includes a first receiving module, a first closing module, a judgment module and a setting module; wherein, the first receiving module is configured to: receive the indication message for closing the application system;

the first closing module is connected to the first receiving module and configured to: close the application program without dependence in the virtual machine to which it belongs;

the judgment module is connected to the first closing module and configured to: judge whether an application program depending on other application program exists in the virtual machine to which the control engine belongs; and the setting module is connected to the judgment module and configured to: set a timer to wait for a closing completion message of a depended application program in the situation that the application program depending on other application program exists.

The control engine 5444 further includes a second closing module and a sending module, wherein:

the second closing module is connected to the first closing module and configured to: in the situation that the depended application program exists in the virtual machine, close the depended application program; and the sending module is connected to the second closing module and configured to: after the closing is completed, send the closing completion message of the application program to the deployment platform, wherein, the closing completion message of the application program carries an identification of the depended application program.

The second closing module includes a sending unit and a receiving unit, wherein:

the sending unit is configured to: send a program closing request to an operating system of the virtual machine to which it belongs; and the receiving unit is connected to the sending unit and configured to: after the depended application program is closed completely, receive the closing completion message of the application program from the operating system, wherein, the closing completion message of the application program carries the identification of the depended application program.

The deployment platform 52 further includes a first receiving module, a second determination module and a forwarding module, wherein:

the first receiving module is configured to: receive the closing completion message of the application program from the control engine;

the second determination module is connected to the first receiving module and configured to: determine an application program depending on an already closed application program according to configuration information of the application system; and the forwarding module is connected to the second determination module and configured to: forward the closing completion message of the application program to the virtual machine to which the application program, which is determined by the second determination module, depending on the already closed application program belongs, to indicate it to close the application program depending on the already closed application program.

The control engine 5444 further includes a second receiving module and a stopping module, wherein:

the second receiving module is configured to: receive the closing completion message of the application program which has been closed; and the stopping module is configured to: stop the timer, and close the application program depending on the already closed application program.

The deployment platform 52 further includes a second receiving module and a notification module, wherein:

the second receiving module is connected to the sending module and configured to: receive the closing completion messages of all the application programs from the virtual machine; and the notification module is connected to the second receiving module and configured to: notify a virtual machine manager of a host computer system to which the virtual machine belongs to close the virtual machine.

The deployment platform 52 further includes a second receiving module and a third determination module, wherein:

the second receiving is connected to the notification module and configured to: receive a closing completion message of the virtual machine from the virtual machine manager; and the third determination module is connected to the second receiving module and configured to: determine that the virtual machines relevant to the application system required to be closed are all closed; and a returning module is connected to the third determination module and configured to: return the closing completion message of the application system.

The deployment platform 52 further includes a third receiving module configured to receive an application system closing request.

It should be explained that the system for closing the application program described in the apparatus embodiment is corresponding to the above-mentioned method embodiment, and its specific realization process has been already explained in detail in the method embodiment, and will no longer go into details here.

It can be known from the above description that, in the embodiment of the present document, the deployment platform indicates the control engine in the virtual machine to close the application programs running in the virtual machine in sequence according to the configuration information of the application system when the application system is smoothly closed, and coordinates and controls the engine to close the application programs deployed in different virtual machines in sequence. The control engine sends the closing completion indication of the application program to the deployment platform after closing the depended application programs completely. The deployment platform, according to the configuration information of the application system, forwards the closing completion indication of the application program to the virtual machine to which other application programs that depend on the application program belong. The control engine in the virtual machine receives a closing completion indication of a certain application program, and if it is judged that other programs depend on the already closed program, then it initiates the closing processes of other application programs. The control engine in the virtual machine notifies the closing completion indications of all programs to the deployment platform after all application programs in the virtual machine are closed completely, and the deployment platform indicates the virtual machine manager to close the virtual machine.

In order to make the technical scheme and the realization method of the present document much clearer, its realization process is described in detail with reference to the optional embodiment hereinafter.

Figure 6:
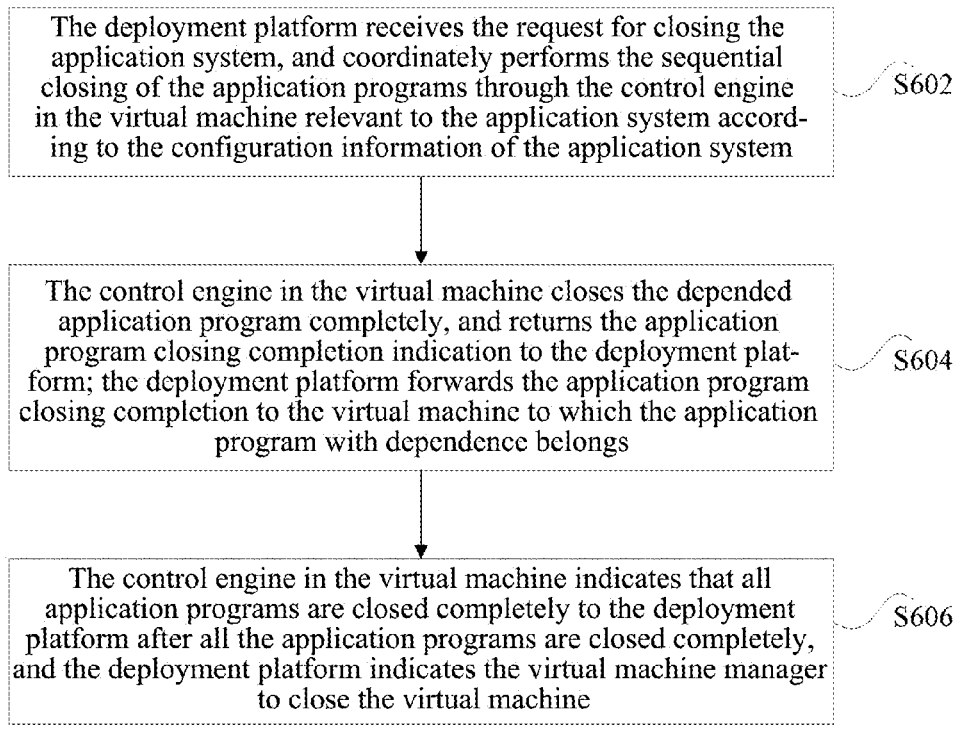
FIG. 6 is a flow chart of a method for closing an application program according to an optional embodiment of the present document.

FIG. 6 is a flow chart of a method for closing an application program according to an optional embodiment of the present document, specifically including the following steps.

In step S602, the deployment platform receives the request for smoothly closing the application system. The deployment platform indicates, according to the configuration information of the application system, the control engine in the virtual machine relevant to the application system to perform the sequential closing of the application programs.

In step S604, after the control engine in the virtual machine closes the depended application program completely, it returns the closing completion indication of the application program to the deployment platform. The deployment platform forwards, according to the configuration information, the closing completion indication of the application program to the virtual machine to which other application programs depending on the application program belong.

In step S606, after the control engine in the virtual machine closes all application programs, it indicates a closing completion indication of all application programs to the deployment platform, and the deployment platform indicates the virtual machine manager to close the virtual machine.

Figure 7:
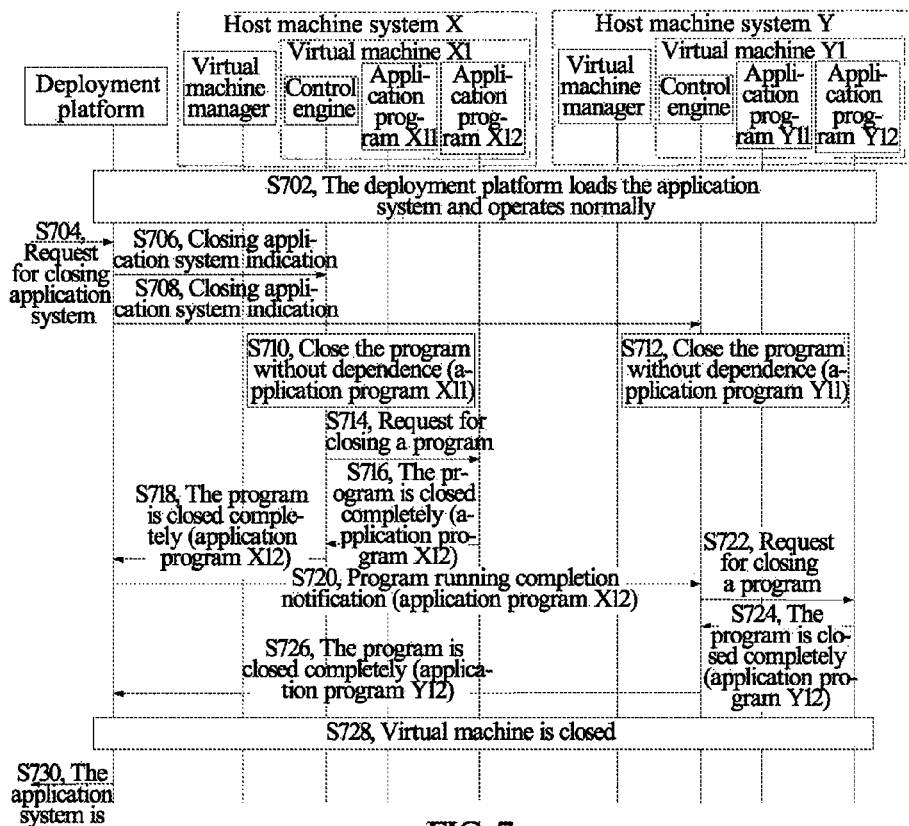
FIG. 7 is an interaction flow chart of closing the application programs cross the virtual machine in sequence according to an optional embodiment of the present document.

FIG. 7 is an interaction flow chart of closing the application programs across the virtual machine in sequence according to an optional embodiment of the present invention. The precondition of the present optional embodiment is as follows: the application system includes 4 application programs deployed on 2 virtual machines respectively. The application program X11 and the application program X12 are deployed on the virtual machine X1; the application program Y11 and the application program Y12 are deployed on the virtual machine Y1. The application program X11 and the application program X12 can be closed independently. The application program Y12 depends on the application program X12, that is, the application program Y12 must be closed after the application program X12 is closed completely.

As shown in FIG. 7, the sequence closing of the application programs across the virtual machine includes the following steps.

In step S702, the deployment platform loads the application system and operates normally, wherein, the distribution of the application programs is as described by the precondition.

In step S704, the deployment platform receives the request for smoothly closing the application system. The deployment platform sends, according to the configuration information of the application system (such as, the virtual machine information included in the application system), the closing indication of the application system to all virtual machines included in the application system.

In step S706, the deployment platform sends the closing indication of the application system to the virtual machine X1 of the host computer system X. The control engine of the virtual machine X1 actively initiates the smoothly closing of the application programs relevant to the application system after receiving the application system closing indication.

In step S708, the deployment platform sends the closing indication of the application system to the virtual machine Y1 of the host computer system Y. The control engine of the virtual machine Y1 initiates the smoothly closing of the application programs relevant to the application system voluntarily after receiving the closing indication of the application system.

In step S710, the control engine of the virtual machine X1 closes the application program without dependence at first, such as, the application program X11 in the present optional embodiment.

In step S712, the control engine of the virtual machine Y1 closes the application program without dependence at first, such as, the application program Y11 in the present optional embodiment. Because the closing of the application program Y12 depends on the before closing of the application program X12, the control engine sets the timer T to wait for the notification message of completely closing the application program X12.

Wherein, in the above-mentioned step S710 and step S712, there is no precedence sequence for the virtual machine X1 and the virtual machine Y1 to close their own application programs without dependence, and can perform at the same time.

From step S714~step S718, the activation engine in the virtual machine X1 closes the application program X12.

In step S714, the control engine of the virtual machine X1 initiates the request for closing the depended application program X12 to the operating system of the virtual machine X1.

In step S716, after the application program X12 is closed completely, the program closing completion message is returned to the control engine of the virtual machine X1.

In step S718, the control engine of the virtual machine X1 sends the program closing completion indication to the deployment platform, wherein, the program closing completion indication carries the application program X12 identification.

In step S720, the deployment platform obtains that the application program Y12 depends on the application program X12 according to the configuration information of the application system, then it forwards the program closing completion indication to the virtual machine Y1 to which the application program Y12 belongs, wherein, the program closing completion indication carries the application program X12 identification.

From step S722~step S726, the activation engine in the virtual machine Y1 closes the application program Y12.

In step S722, after the control engine of the virtual machine Y1 receives the closing completion indication about the application program X12, it stops the timer T, and initiates the request for closing the application program Y12 to the operating system of the virtual machine Y1.

In step S724, after the application program Y12 is closed completely, the program closing completion message is returned to the control engine of the virtual machine Y1.

In step S726, the control engine of the virtual machine Y1 sends the program closing completion indication to the deployment platform, wherein, the program closing completion indication carries the application program Y12 identification.

In step S728, the control engine in the virtual machine notifies the deployment platform after the application program in the virtual machine is closed completely, and the deployment platform initiates the virtual machine closing process to the virtual machine manager.

In step S730, the deployment platform returns the application system closing completion message.

Figure 8:
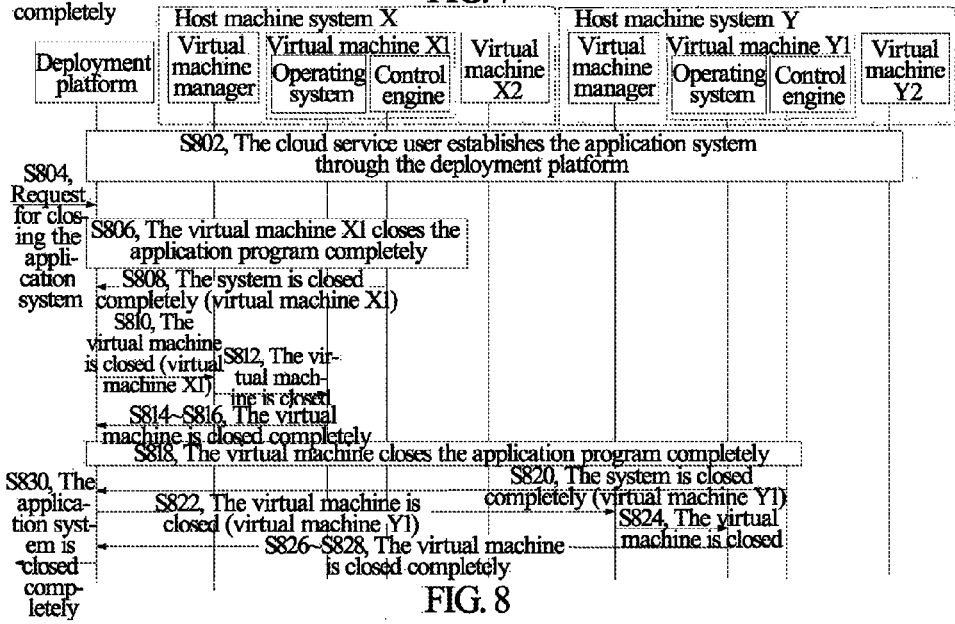
FIG. 8 is an interaction flow chart of smoothly closing the virtual machine according to an optional embodiment of the present document.

FIG. 8 is an interaction flow chart of smoothly closing the virtual machine according to an optional embodiment of the present document. The application programs relevant to the application system are already closed completely on the virtual machine, and the virtual machine notifies the deployment platform to perform the closing of the virtual machine, as shown in FIG. 8, including the following steps.

In step S802, the cloud service users establish the virtual system through the deployment platform, and the virtual system deploys the application system of the user, that is, the virtual system deploys the application programs which make up the application system on a group of relevant virtual machines.

In step S804, the deployment platform receives the request for smoothly closing the application system.

In step S806, the deployment platform interacts with the virtual machine X1 in the host computer system X, and closes the application program running in the virtual machine X1 completely.

From step S808~step S816, the deployment platform closes the virtual machine X1.

In step S808, the virtual machine X1 notifies the deployment platform that the application programs in the virtual machine X1 are closed completely.

In step S810, the deployment platform notifies the virtual machine manager in the host computer system X to close the virtual machine X1.

In step S812, the virtual machine manager of the host computer system X closes the virtual machine X1, and the operating system of the virtual machine X1 performs the closing process of the virtual machine X1.

In step S814, the virtual machine X1 notifies the virtual machine manager that the virtual machine X1 is closed completely.

In step S816, the virtual machine manager notifies the deployment platform that the virtual machine X1 is closed completely.

In step S818, the deployment platform interacts with the virtual machine Y1 in the host computer system Y, and closes the application program running in the virtual machine Y1 completely.

From step S820~step S828, the deployment platform closes the virtual machine Y1.

In step S820, the virtual machine Y1 notifies the deployment platform that the application programs in the virtual machine Y1 are closed completely.

In step S822, the deployment platform notifies the virtual machine manager in the host computer system Y to close the virtual machine Y1.

In step S824, the virtual machine manager of the host computer system Y closes the virtual machine Y1, and the operating system of the virtual machine Y1 performs the closing process of the virtual machine Y1.

In step S826, the virtual machine Y1 notifies the virtual machine manager that the virtual machine Y1 is closed completely.

In step S828, the virtual machine manager notifies the deployment platform that the virtual machine Y1 is closed completely.

In step S830, the deployment platform returns the application system closing completion message.

It should be explained that the steps shown in the flow chart of the accompanying figures can be executed in the computer system, such as a group of computer executable indications, and, although the logic sequence is shown in the flow chart, in some cases, the shown or described steps can be executed by a sequence different from here.

In sum, according to the above-mentioned embodiments of the present document, a method and system for closing an application program are provided. Through the present document, the deployment platform indicates the virtual machine relevant to the application system required to be closed to close the application programs in the application system in sequence, which makes multiple application programs of the application system deployed on multiple virtual machines be closed in sequence.

Obviously, it can be understood by those skilled in the art that each module or each step above-mentioned in the present document can be implemented by the universal calculating apparatus, and they can be integrated in a single calculating apparatus, or distributed in the network made up by a plurality of calculating apparatus. Alternatively, they can be implemented by the executable program codes of the calculating apparatus. Accordingly, they can be stored in the storage apparatus and implemented by the calculating apparatus, or they are made to each integrated circuit module respectively, or a plurality of modules or steps therein are made into the single integrated circuit module to be implemented. This way, the present invention is not limit to any specific form of the combination of the hardware and software.

The above description is only the preferred embodiments of the present document and is not intended to limit the present document. For those skilled in the art, the present document can have various modifications and variations. All of modifications, equivalents and/or variations without departing from the spirit and essence of the present document should be embodied in the scope of the appending claims of the present document.

INDUSTRIAL APPLICABILITY

Through the above-mentioned technical scheme, the deployment platform indicates the virtual machine relevant to the application system required to be closed to close the application programs in the application system in sequence, which makes multiple application programs of the application system deployed on multiple virtual machines be closed in sequence. Therefore, the present document has very strong industrial applicability.

What we claim is:

1. A method for closing application programs of an application system, wherein the application programs are deployed on a series of virtual machines, and each virtual machine runs one or more application programs, the method comprising:

when the application system is to be closed, a cloud service platform determining virtual machines running application programs of the application system according to configuration information of the application system; wherein the configuration information of the application system comprises: close orders of the application programs in the application system, and virtual machines corresponding to each application program; and the cloud service platform sending indication messages for closing the application programs of the application system to the virtual machines running application programs of the application system, wherein, the indication messages are used for indicating the virtual machines to close the application programs of the application system in a sequence based on close orders of the application programs in the configuration information;

wherein the cloud service platform sending the indication messages to a control engine in each virtual machine running application programs of the application system, and the control engine is responsible for controlling sequential closing of the application programs run in the virtual machine.

2. The method according to claim 1, wherein after the cloud service platform sending the indication messages for closing the application programs of the application system to the virtual machines running the application programs of the application system, the method further comprises:

the control engine of each virtual machine receiving the indication message for closing the application programs of the application system from the cloud service platform, and closing application programs without dependence relationship with other application programs in the virtual machine to which the control engine belongs;

the control engine judging whether application programs depending on other application programs exists in the virtual machine to which the control engine belongs; and if yes, the control engine setting a timer to wait for closing completion messages of depended application programs.

3. The method according to claim 2, wherein, after the control engine closes the application program without dependence relationship with other application programs in the virtual machine to which the control engine belongs, the method further comprises:

if depended application programs exist in the virtual machine, then the control engine closing the depended application programs; and after the closing is completed, the control engine sending the closing completion message of the application programs to the cloud service platform, wherein, the closing completion message of the application programs carries an identification of the depended application programs.

4. The method according to claim 3, wherein, the steps of the control engine closing the depended application program comprise:

the control engine sending a program closing request including the application programs to be closed to an operating system of the virtual machine to which the control engine belongs; and after the depended application programs are closed completely, the control engine receiving the closing completion message of the application programs from the operating system, wherein, the closing completion message of the application programs carries the identification of the depended application programs.

5. The method according to claim 3, wherein after the control engine sends the closing completion message of the application programs to the cloud service platform, the method further comprises:

the cloud service platform receiving the closing completion message of the application programs from the control engine;

the cloud service platform determining close pending application programs depending on already closed application programs according to the configuration information of the application system; and the cloud service platform forwarding the closing completion messages of the application programs to the virtual machines to which the application programs depending on the already closed application programs belongs.

6. The method according to claim 5, wherein after the cloud service platform forwards the closing completion messages of the application programs to the virtual machines to which the application programs depending on the already closed application program belongs, the method further comprises:

each control engine of the virtual machine to which the close pending application program depending on the already closed application program belongs receiving the closing completion message of the application programs, stopping the timer, and closing the application programs depending on the already closed application program.

7. The method according to claim 1, wherein after the cloud service platform sends the indication messages for closing the application programs of the application systems to the virtual machines running the application programs of the application system, the method further comprises:

the cloud service platform receiving a closing completion message for all the application programs from the virtual machine; and the cloud service platform notifying a virtual machine manager of a host computer system to which the virtual machine belongs to close the virtual machine.

8. The method according to claim 7, wherein after the cloud service platform notifies a virtual machine manager of a host computer system to which the virtual machine belongs to close the virtual machine, the method further comprises:

the cloud service platform receiving a closing completion message of the virtual machine from the virtual machine manager;

the cloud service platform determining that the virtual machines running the application programs of the application system required to be closed are all closed; and the cloud service platform returning the closing completion message of the application system.

9. The method according to claim 1, wherein before the cloud service platform determines the virtual machines running the application programs of the application system according to the configuration information of the application system, the method further comprises: the cloud service platform receiving an application system closing request.

10. A system for closing application programs of an application system, wherein the application programs are deployed on a series of virtual machines, comprising a cloud service platform and a host computer, wherein:

the cloud service platform comprises a server for performing a determination module and a sending module, wherein:

the determination module is configured to: determine virtual machines running the application programs of application system according to configuration information of the application system when the application system is to be closed; and determine virtual machines to which other application programs depending on the application programs belongs according to a received closing completion message of the application programs;

wherein the configuration information of the application system comprises: close orders of the application programs in the application system, and virtual machines corresponding to each application program;

the sending module is configured to: send indication messages for closing the application programs of the application system to the virtual machines to running the application programs of the application system, wherein, the indication message is used for indicating the virtual machines to close the application programs of the application system in a sequence based on the close orders of the application programs in the configuration information; after receiving the closing completion message of the application programs and determining the virtual machines to which other application program depending on the application program belongs, forward the closing completion message of the application programs to the determined virtual machines; and the host computer comprises: a virtual machine manager and one or more virtual machines, the virtual machine comprises: an operating system, a control engine and one or more application programs, and the control engine is used for responding to the cloud service platform, and controlling sequential closing of the application programs of the application system.

11. The method according to claim 2, wherein after the cloud service platform sends the indication messages for closing the application programs of the application system to the virtual machines running the application programs of the application system, the method further comprises:

the cloud service platform receiving a closing completion message for all the application programs from the virtual machine; and the cloud service platform notifying a virtual machine manager of a host computer system to which the virtual machine belongs to close the virtual machine.

12. The method according to claim 3, wherein after the cloud service platform sends the indication messages for closing the application programs of the application system to the virtual machines running the application programs of the application system, the method further comprises:

the cloud service platform receiving a closing completion message for all the application programs from the virtual machine; and the cloud service platform notifying a virtual machine manager of a host computer system to which the virtual machine belongs to close the virtual machine.

13. The method according to claim 4, wherein after the cloud service platform sends the indication messages for closing the application programs of the application system to the virtual machines running the application programs of the application system, the method further comprises:

the cloud service platform receiving a closing completion message for all the application programs from the virtual machine; and the cloud service platform notifying a virtual machine manager of a host computer system to which the virtual machine belongs to close the virtual machine.

14. The method according to claim 5, wherein after the cloud service platform sends the indication messages for closing the application programs of the application system to the virtual machines running the application programs of the application system, the method further comprises:

the cloud service platform receiving a closing completion message for all the application programs from the virtual machine; and the cloud service platform notifying a virtual machine manager of a host computer system to which the virtual machine belongs to close the virtual machine.

15. The method according to claim 6, wherein after the cloud service platform sends the indication messages for closing the application programs of the application system to the virtual machines running the application programs of the application system, the method further comprises:

the cloud service platform receiving a closing completion message for all the application programs from the virtual machine; and the cloud service platform notifying a virtual machine manager of a host computer system to which the virtual machine belongs to close the virtual machine.

* * * * *